(12) United States Patent
Alvin et al.

(10) Patent No.: US 6,290,743 B1
(45) Date of Patent: Sep. 18, 2001

(54) TUBULAR AND HONEYCOMB METAL FAIL-SAFE REGENERATOR DEVICES

(75) Inventors: Mary Anne Alvin, Pittsburgh; Eugene E. Smeltzer, Export; Gerald J. Bruck; Thomas E. Lippert, both of Murrysville, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/467,236

(22) Filed: Dec. 20, 1999

(51) Int. Cl.[7] ............................ B01D 35/14; B01D 29/52
(52) U.S. Cl. .................. 55/482; 55/502; 55/508; 55/523
(58) Field of Search .................. 55/523, 508, 502, 55/341.1, 482

(56) References Cited

U.S. PATENT DOCUMENTS

| 4,364,760 | 12/1982 | Higuchi et al. |
| 5,069,697 | 12/1991 | Hamaguchi et al. |
| 5,185,019 | 2/1993 | Haldipur et al. |
| 5,433,771 | 7/1995 | Bachovin et al. |
| 5,601,626 | * 2/1997 | Hori et al. .......................... 55/493 |
| 5,876,471 | 3/1999 | Lippert et al. |

* cited by examiner

*Primary Examiner*—David A. Simmons
*Assistant Examiner*—Robert A. Hopkins (57) ABSTRACT

A filter assembly is made for filtering hot gas within a cleanup system pressure vessel (22), where the filter assembly (60) contains a filter housing (62) having an interior chamber (66), and a filter element (28) attached to the bottom of a fail-safe/regenerator filter device (129) which contains a plurality of elongated passageway members either of a porous metal media tube type (120) or of a porous metal media honeycomb cartridge member type (130), where the passageway members are effective to facilitate enhanced capture of particulates in the event of filter element (28) failure.

13 Claims, 4 Drawing Sheets

TUBULAR AND HONEYCOMB METAL FAIL-SAFE REGENERATOR DEVICES

BACKGROUND OF THE INVENTION

Field of the Invention

This invention relates generally to hot-gas cleanup systems for feed gas to turbines; and more particularly, to a filter assembly for such systems that includes an all metal fail-safe/regenerator filter device, containing an array of individual small porous metal media tubes, or an alternating channel porous structure such as a honeycomb metal media means to trap particulates, eliminating the need for additional heat transfer surfaces as Raschig rings, and screen assemblies as a means of particulate removal. This metal fail-safe/regenerator filter device is attached to a metallic type filter element.

Background Information

Modern industrial methods have resulted in a need for an apparatus that is capable of efficiently filtering high temperature combustion or gasification gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized.

Also, as a key component in advanced coal-or biomass-based power applications, hot gas filtration systems protect the downstream heat exchanger and gas turbine components from particle fouling and erosion, cleaning the process gas to meet emission requirements. When installed in either pressurized fluidized-bed combustion (PFBC) plants, pressurized circulating fluidized-bed combustion (PCFBC) plants, or integrated gasification combined cycle (IGCC) plants, lower downstream component costs are projected, in addition to improved energy efficiency, lower maintenance, and elimination of additional expensive fuel or flue gas treatment systems. As a critical component, long-term performance, durability, and life of the filter elements and associated high temperature gasket seals are essential to the successful operation of hot gas filtration systems in advanced combustion and gasification applications.

U.S. Patent Nos. 5,185,019; 5,433,771 and 5,876,471 (Haldipur et al.; Bachovchin et al. and Lippert et al., respectively), teach improved gasket assemblies that can be employed with conventional or thin-walled ceramic candle filters. All three show separate holders/chambers for fail-safe regenerator units. Bachovchin et al. teach a combination of four metal screens in combination with a bed of particles, such as stainless steel Raschig rings, as shown in FIG. 6. Fine screens trap particulate matter within the unit and prevent the collected particulate matter from being liberated during reverse cleaning pulsation. The Raschig rings form a thermal regenerator which heats pulses of cold gas during reverse flow cleaning. Lippert et al. in their FIG. 4 show another such fail-safe/regenerator device which is permanently mounted within a filter housing having associated gaskets, in contact with a ceramic candle filter. The fail-safe/regenerator similarly prevents particulate matter from traveling into the clean gas area of the pressure vessel if a ceramic filter element fails. Additionally, U.S. Ser. No. 09/263,436, filed on Mar. 4, 1999, now U.S. Pat. No. 6,123,746, provided an improved gasketing assembly, with an optional fail-safe/regenerator, and described possible use of metallic filter elements having the same connection and configuration as standard ceramic candle filters, and U.S. Ser. No. 09/393,561 filed on Sep. 10, 1999 teaches all metal filter configuration with reduced use of gaskets, and an integral filter fail-safe/regenerator device similar to Bachovchin et al.

While these inventions provide advances in the art, enhanced particulate capture capabilities beyond screens and Raschig rings are needed, as well as the ability of any new assembly to be retrofit into existing filter systems. Also, even more efficient heat transfer is needed during filter assembly cleaning operations.

Besides these specific type candle filters, others have provided honeycomb structures used as filters, as taught in U.S. Patent application Ser. Nos. 4,364,760; and 5,069,697 (Higuchi et al., and Hamaguchi et al., respectively). These structures have parallel channels through the body with half being sealed at one end and the other half sealed at the other end, for use to trap dust from gas on Diesel engines. These patents define the "honeycomb" structure in the filter art.

There is still a need to develop higher reliability filter configurations for use in advanced coal-fired operation applications. There is also a need for improved heat transfer from incoming cold gas flowing into the filter elements during back pressure cleaning of the filter elements. Finally, it would be desirable that any improved filter assembly be able to substitute into existing systems in the field.

SUMMARY OF THE INVENTION

Therefore, it is a main object of this invention to provide an improved fail-safe/regenerator filter device having improved filtering capability and which is resistant to sulfur, alkali, chlorides, steam and other contaminants found in coal gas streams.

It is a further object to improve heat transfer efficiency of the fail-safe/regenerator during cleaning operations and provide a design that can easily substitute into existing units.

These and other objects are accomplished by providing a filter assembly for filtering gas, comprising a fail-safe/regenerator filter device and an elongated filter element, within a hot gas cleanup system pressure vessel having a hot contaminated gas entry, said filter assembly comprising: a filter housing, said filter housing having a peripheral sidewall, said sidewall defining an interior chamber; a porous, elongated filter element body attached to the bottom end of the fail-safe/regenerator filter device; and a one-piece, all metal, fail-safe/regenerator filter device, having a top and bottom end, disposed within the interior chamber of the filter housing; said fail-safe/regenerator filter device containing a metal support attached to a plurality of, porous elongated passageway members selected from: 1) elongated tubes having a bottom end with openings, and 2) honeycomb members having a bottom end with openings and a plurality of parallel passageways with alternating passageways being sealed at the top end and the bottom end, with the open bottom ends facing the filter element. The passageways thus are either a tubular or honeycomb cartridge. This fail-safe/ regenerator filter device preferably eliminates the use of Raschig rings, metal screens and the like, and the porous walls of the gas passageways provide high surface area not only to heat the incoming pulse gas, but also to trap minute particulate matter.

The invention also resides in a candle or tube filter holder and gasket assembly for holding a candle or tube filter element within a hot gas cleanup system pressure vessel, the filter element including a body having opposing ends, one defining a flange open end and the other defining a closed end; the filter element body having a smaller inner diameter surface and a larger outer diameter surface, said candle or tube filter holder and gasket assembly comprising: (a) a filter housing, said filter housing having a peripheral sidewall, said sidewall defining an interior chamber; (b) a filter element selected from the group consisting of a porous monolithic ceramic matrix, a filament wound ceramic matrix, a continuous fiber ceramic composite matrix, or a metal or intermetallic media; at least one compliant gasket separate and apart from the filter housing, said complaint gasket positioned next to the filter element and effective to provide a seal between the filtered gas and the unfiltered gas, and to cushion the filter element; (d) means of coupling the filter element, filter housing, and gasket within the pressure vessel; and (e) a fail-safe/regenerator filter device for heating the pulse cleaning gas, and facilitating enhanced capture of particulates in the event of filter element failure, damage, or breakage, or gasket failure, said device selected from the group consisting of a plurality of porous metal media tubes that are positioned in and welded along through holes in a dense, perforated metal plate, which in turn is welded to a metal spacer ring, and a porous metal media honeycomb cartridge which is welded to a metal spacer ring. The porous metal media tubes and/or the cylindrical porous metal media honeycomb cartridge for the fail-safe/regenerator filter device: can be separate and removable from the filter housing and gasket assembly, or alternately, permanently welded into the filter housing and gasket assembly; can be modified to include a metal insert for use with very thin walled continuous fiber ceramic composite filter elements; can be used separate and independent from the porous metal or intermetallic candle filters, can be welded to the top surface of porous metal or intermetallic filters that are constructed with a standard dense metal flange.

A variety of compliant seals and gaskets can be used in a variety of combinations for sealing or holding the fail-safe/regenerator filter unit and filter element(s).

The porous metallic media used in the construction. of the fail-safe/generator filter passageways may be either of a single powder particle or fiber size, or may include a finer powder particle or fiber layer (membrane) along preferably the inner and/or alternatively the outer surfaces of the unit. The passageways can also be made from porous, fiber or preferably powder, metallic, intermetallic, corrosion resistant superalloy compositions. These type passageways achieve particulate collection efficiencies greater than 99.999% for greater than 1 to 5 micron "fines," and pressure drop characteristics less than 0.25 to 0.5 inches/water gauge (in-wg)/1 foot per minute (fpm).

BRIEF DESCRIPTION OF THE DRAWINGS

For a better understanding of the invention, reference may be made to the exemplary embodiments shown in the accompanying drawings, which.

DESCRIPTION OF THE PREFERRED EMBODIMENTS

Figure 1:
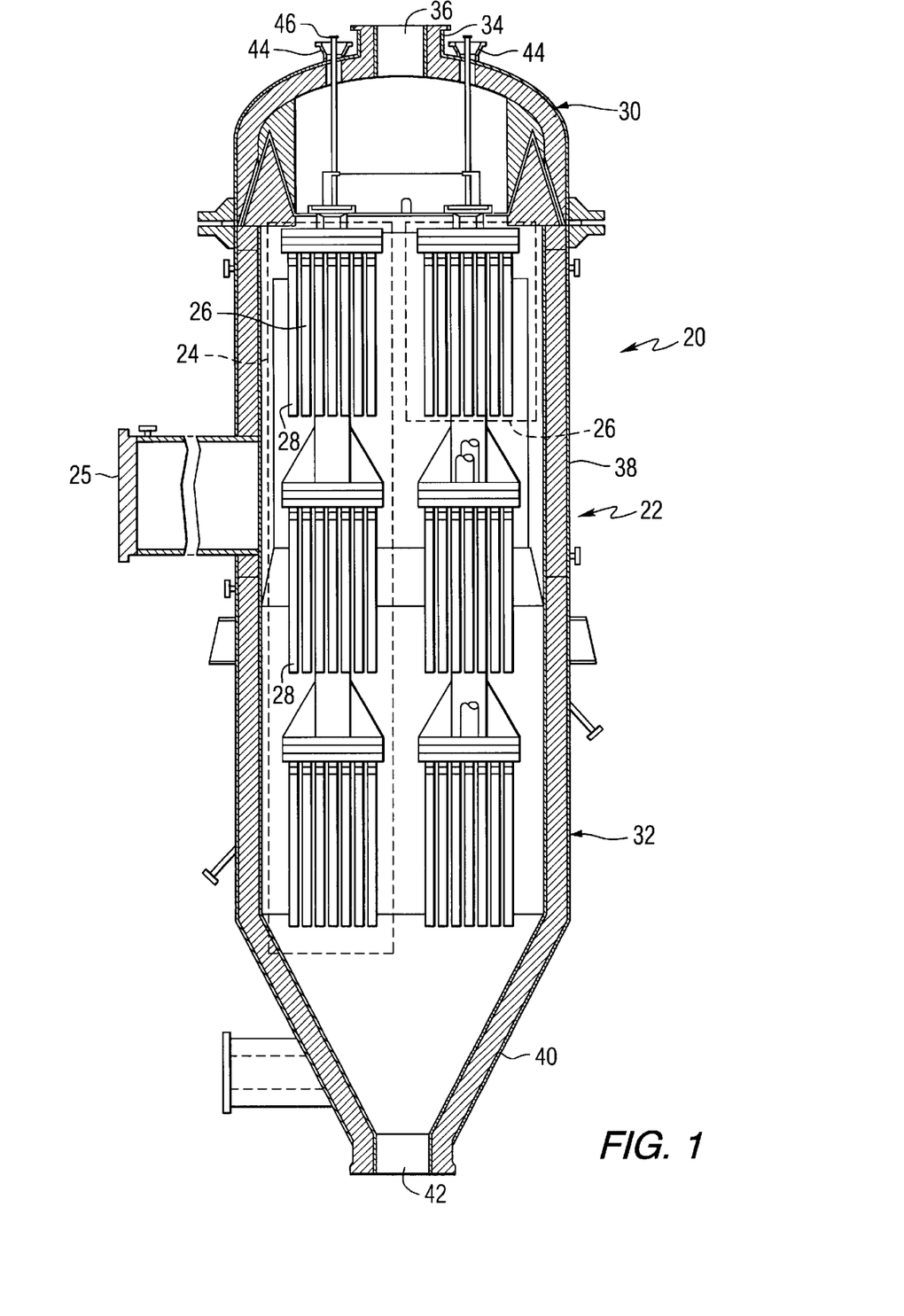
FIG. 1 is a longitudinal section view of a pressure vessel incorporating a filter assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of metallic, intermetallic and/or ceramic filter elements 28.

The pressure vessel 22 has a dome-shaped head 30 and a body 32. The dome-shaped head 30 terminates in a linear tip 34, defining an exit opening or nozzle 36 for the filtered gas to be removed from the vessel 22. The body 32 includes a dirty gas inlet 25, where gas enters at a temperature of from about 1110° F. (600° C.) to about 1830° F. (1000° C.). The body also contains an upper part 38 having a generally circular cylindrical shape joined by a frustoconical ash hopper 40 for receiving the particulate matter, terminating in a linear tip defining an opening or nozzle 42 connected to an ash discharge line. A plurality of ports 44 extend from the dome-shaped head 30. The ports 44 provide a site for inserting instrumentation and for viewing the interior of the dome-shaped head 30 during shut-down periods. Through each port, tubes 46 for supplying a back pulse burst of gas for cleaning the filters 28 can be placed.

Figure 2:
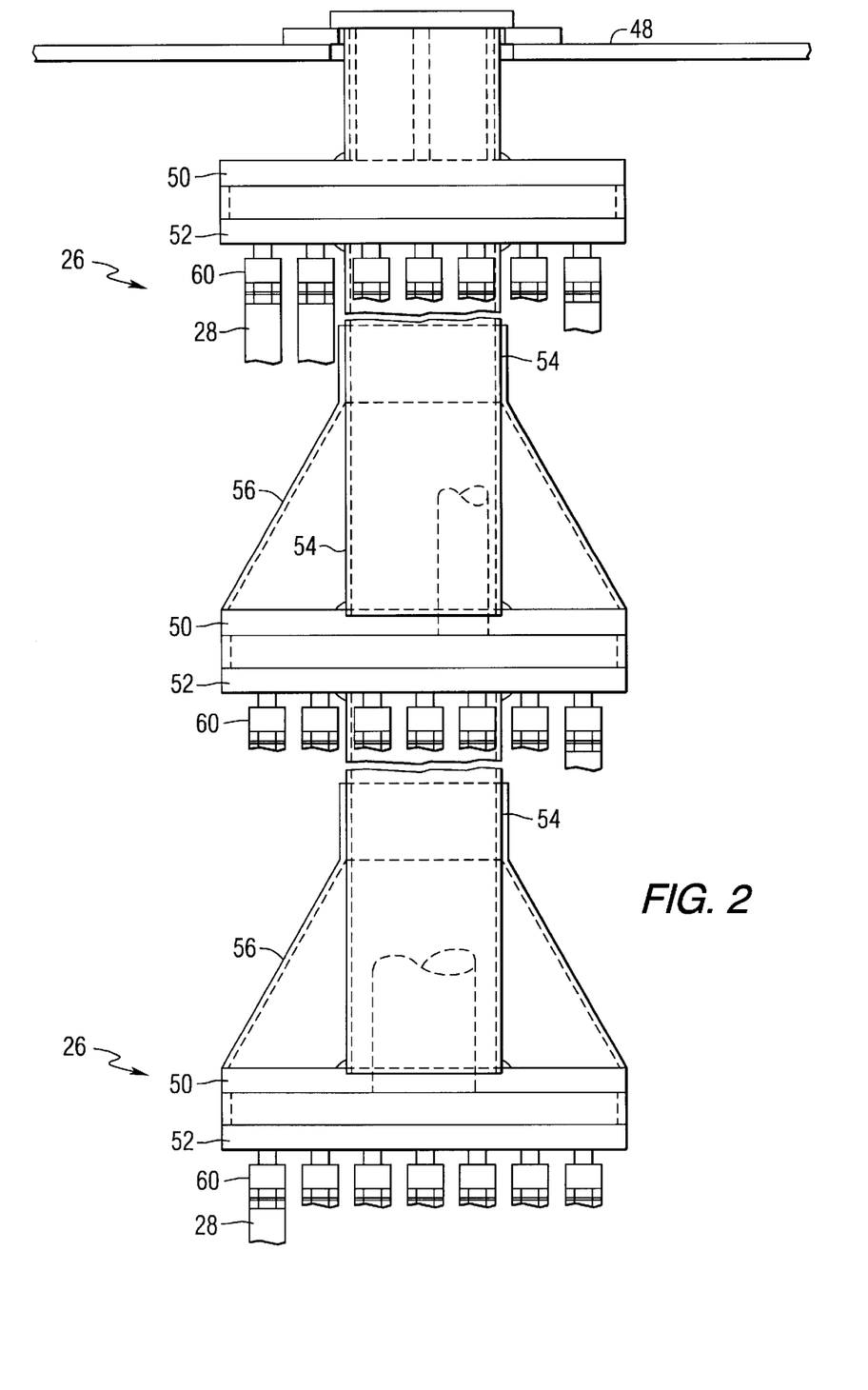
FIG. 2 is a side elevation view of an array of filter assemblies, including filter elements, coupled to a tube sheet as shown in FIG. 1.

Referring to FIG. 2, the pressure vessel includes a tube sheet 48. The tube sheet 48 supports the plurality of filter element arrays 26. Each filter element array 26 comprises a manifold plenum consisting of an upper plate 50 and a lower plate 52 and side plate. In accordance with the present invention, each filter element 28 is held by a filter assembly 60 and coupled to the corresponding lower plate 52 of the manifold plenum. The filter assemblies 60 are integrated into a structural unit by plenum support pipes 54. Each plenum support pipe 54 is secured centrally within the pressure vessel 22. A dust shed or particle-deflector 56 having a generally frustoconical shape is also shown.

Prior experience has shown that oxidation of nonoxide-based ceramic monolithic, continuous fiber reinforced ceramic composites (CFCC), and reticulated foam ceramic matrices, has resulted when these materials are used in the construction of porous candle filter elements which experienced long-term field operation that is 500–3000 hours of pressurized fluidized-bed combustion (PFBC), or pressurized circulating fluidized-bed combustion (PCFBC). Similarly, oxide-based monoliths were shown to be susceptible to thermal fatigue and/or shock during process operation. Oxide-based CFCC and filament wound matrices were shown to have low strength semi-densified flanges; have low strength and load bearing filter bodies; have the potential for embrittlement of the contained CFCC fibers; and to possibly debond along inserted plugs, seams, applied membranes, component layers, and the like. As a result, recent efforts in the hot gas filtration technology have been directed to the development and assessment of the potential use of metal and intermetallic media in advanced coal-fired applications for both the candle filter or alternative filter configurations, and other components.

For use in advanced particulate filtration systems which are installed and operated in PFBC, PCFBC, IGCC, biomass and industrial applications, the porous ceramic, metal, or intermetallic filter elements should, advantageously, achieve particle collection efficiencies, pressure drop characteristics, and configuration and dimensional tolerances, as follows: particle collection efficiencies that are greater than 99.999%; an initial pressure drop of less than or equal to 10 in-wg (inch-water gauge)/10 fpm (feet per minute); certification that the porous ceramic and/or metal media and/or weld materials will withstand oxidation and/or corrosive attack from high temperature process gas streams containing steam, gaseous sulfur, chlorides, and/or alkali species; and be capable of being pulse cleaned, removing ash from the filtration surface and returning to a lowered pressure drop. The preferred filter assembly 60 of the present invention is used with a fail-safe/regenerator filter device utilizing porous, elongated, filter passageways which will now be described.

This invention describes two alternate, metal, fail-safe/regenerator filter embodiments for capturing particulates in the event of failure, damage, or breakage of a porous candle filter during operation in advanced coal-based power systems, and/or biomass and industrial applications. In addition, said metal, fail-safe/regenerator filters can be directly attached to metal and intermetallic filter elements, providing an integral unit, and facilitating ease of installation within existing filtration systems. These metal, fail-safe/regenerator filters utilize porous metal media assembled in such a manner as to provide high surface area and particulate retention capabilities, to not only heat the pulse cleaning gas to reduce the impact of thermal shock of the porous monolithic ceramic, ceramic filament wound and/or continuous fiber ceramic composite (CFCC) candle or tube filters, as well as porous metal and/or intermetallic candle or tube filters, but also to assure prevention of the passage of particulate fines into the clean gas steam in the event of filter or gasket failure. They also protect downstream gas turbine and heat exchanger equipment, and maintain air pollution control emissions standards for plant operation.

These metal fail-safe/regenerator filters provide assembly for retrofit installation and/or placement within metal filter housings; assurance of mitigating particulate leak paths around the current and prior art filter flange, gaskets, and/or fail-safe/regenerator filter units; utilization with the porous monolithic ceramic, ceramic filament wound, and/or CFCC candle or tube filters, as well as porous metal and/or intermetallic candle or tube filter, and the like. Embodiments for direct welding of the integral metal flange/fail-safe/regenerator filter units into the holder assembly are also considered part of the invention. Alternately, the integral fail-safe/regenerator filter/metallic or intermetallic filter element may be welded to the filter housing, eliminating the use of compliant gaskets, and providing complete barrier filtration within existing filtration systems.

Figure 3:
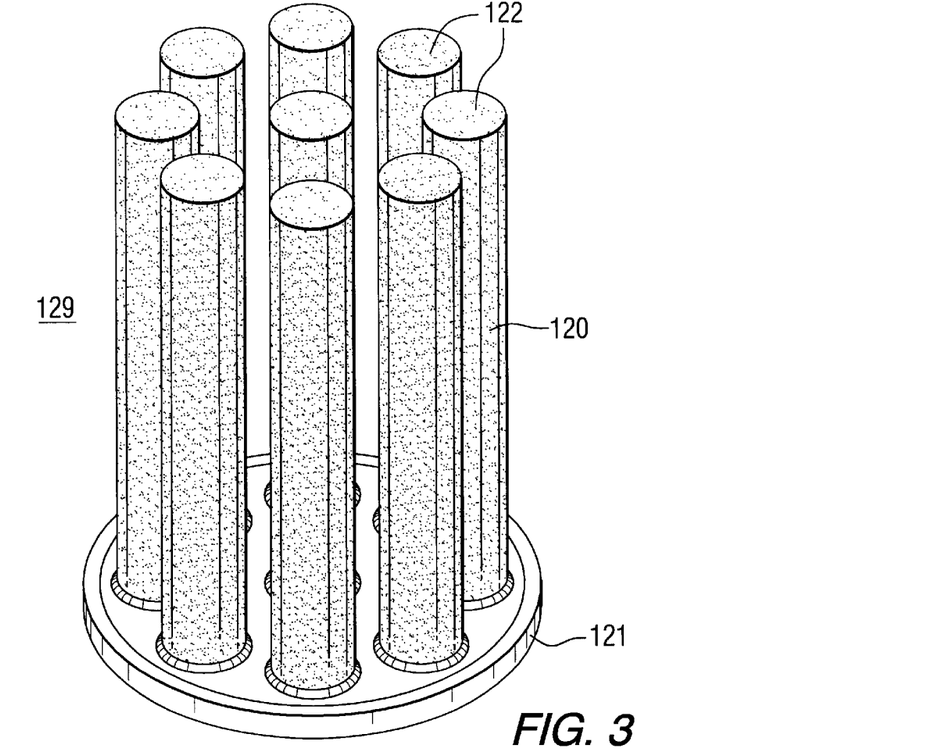
FIG. 3, shows a three-dimensional view of a tubular fail-safe/regenerator filter device shown assembled in FIG. 6.
Figure 4:
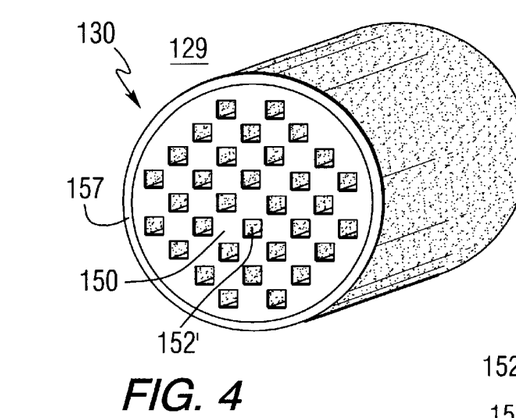
FIG. 4, shows a three-dimensional view of a porous metal media honeycomb fail-safe/regenerator filter device shown assembled in FIG. 7.
Figure 5:
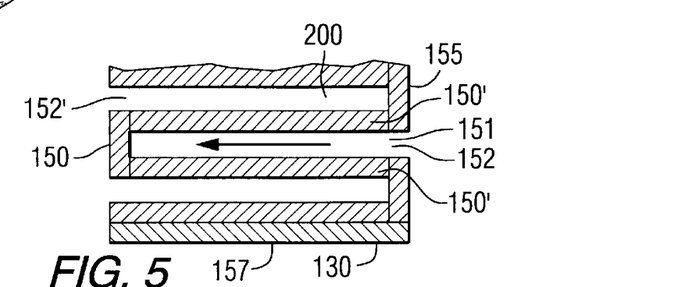
FIG. 5, shows a partial cross-section of the filter device of FIG. 4 showing the interior honeycomb configuration.
Figure 6:
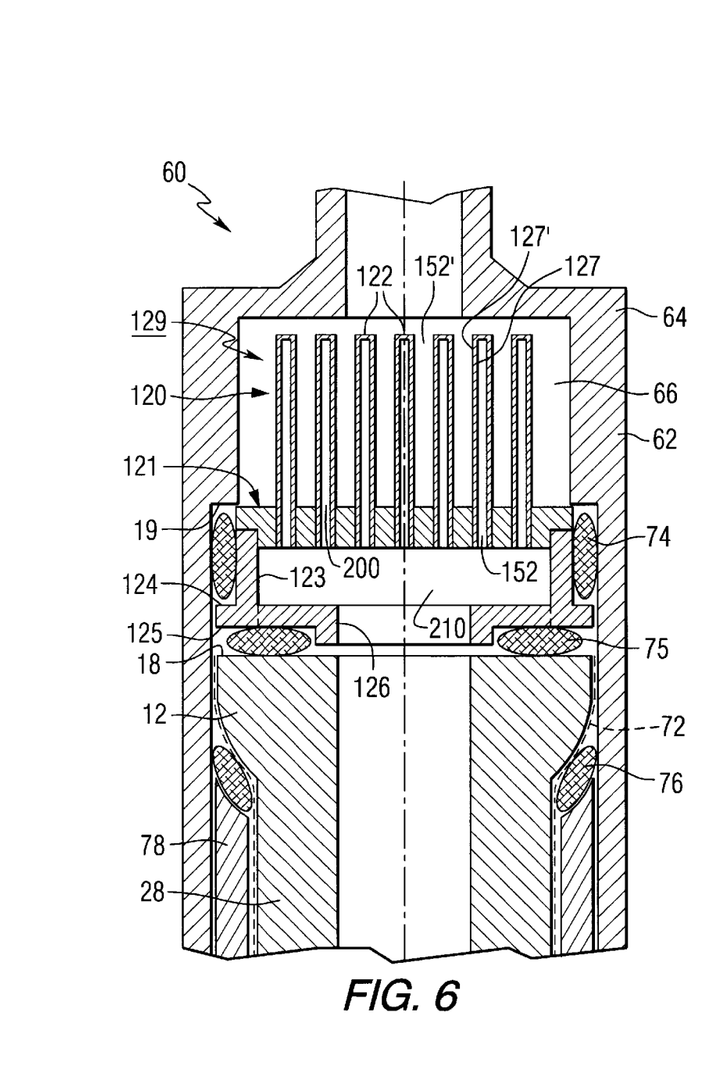
FIG. 6, which best shows the invention, is a sectional view of an elongated tubular filter assembly, including a fail-safe/regenerator filter device, employing tubular passageways, with an associated, connected, porous, hollow filter element, and using one embodiment of gasket placement.
Figure 7:
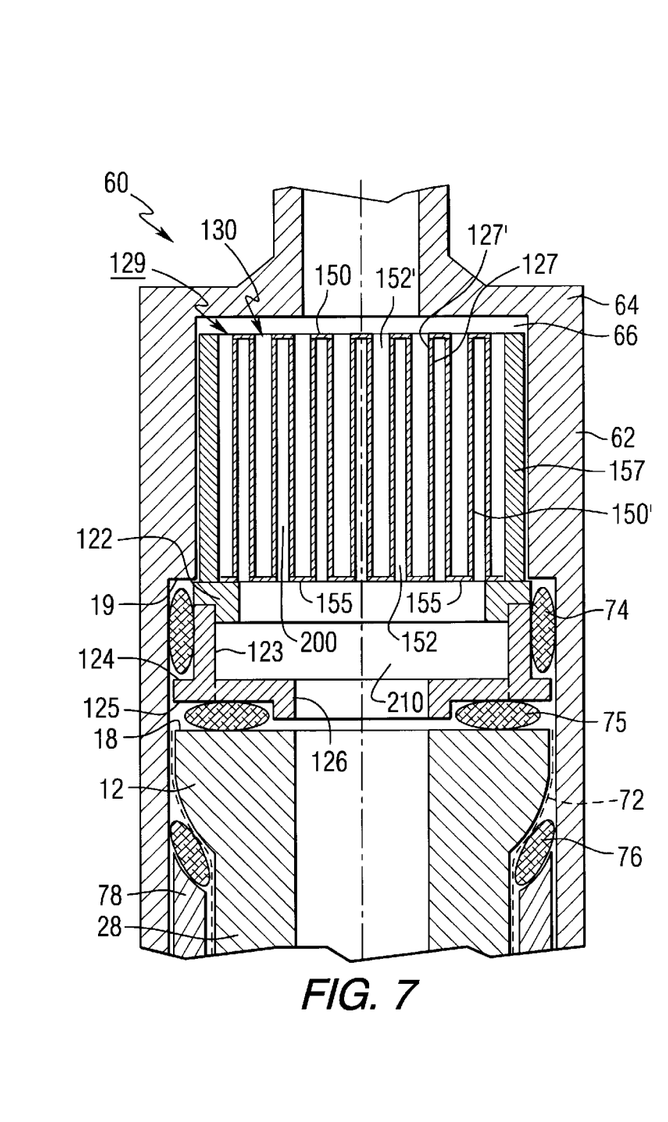
FIG. 7, is a sectional view of a honeycomb filter assembly, including a fail-safe/regenerator filter device employing porous metal media honeycomb passageways, with an associated, connected, porous, hollow filter element, and using one embodiment of gasket placement.

As shown in FIG. 3, the porous elongated metal media tubes 120 of fail-safe/regenerator filter 129 have closed porous tops 122, are packed via assembly into holes positioned through a dense, perforated metal plate support 121, and are permanently welded or otherwise attached to the metal plate support 121, which in turn is welded to a metal spacer ring 123, shown in FIG. 6, forming a tubular, metal, fail-safe/regenerator filter device. Alternately as shown in FIG. 4, a fail-safe/regenerator filter device 129, comprising a cylindrical, porous, elongated, metal media honeycomb cartridge 130 is welded directly to a metal support plate 122, and subsequently to a metal spacer ring 123, shown in FIG. 7, forming a honeycomb, metal media, fail-safe/regenerator filter device. FIG. 5 shows a partial honeycomb cross-section. The term "honeycomb" is defined here as a body having a plurality of parallel passageways or channels 200 extending through the body with alternate channels being sealed at the top end 150, and at the other end 155 as shown in FIG. 5, so that, in the event of filter or gasket failure, damage or breakage, particulate laden gas 151 must enter passageway 152. Gas passes through walls 150' of the adjacent channel, and exits via passageway 152' with retention of particulates within passageway 152. The alternating open bottom passageways 152' and top closed passageways 152, are also shown in FIG. 7. The term "honeycomb" is also meant to include minor variations of the above description. For example, the term also includes a structured body having a plurality of parallel channels through it when selected channels are sealed at one end, while the remainder of the channels are sealed at opposite ends. An integral external, porous or dense, non-channel passageway area 157 surrounds the periphery of the metal media honeycomb cartridge.

Similar to the honeycomb fail-safe/regenerator filter device, in the event of filter or gasket failure, damage, or breakage, particulate laden gas enters passageway 152 of the porous elongated metal media tube(s) 120, shown in FIG. 6, gas permeates through the porous tubes, and exits via passageway 152', with retention of particulates within passageway 152.

Both porous metal media tubes 120 and cylindrical porous metal media honeycomb cartridge 130 are manufactured with a defined porosity to meet requirements for gas flow resistance, and capture of particulates in the event of filter element or gasket failure, damage, or breakage, mitigating the release of particulates from the dirty process gas stream into the clean gas stream. As shown in FIGS. 6 and 7, the porous metal media tubes 120 and honeycomb channels 152 and 152' provide elongated passageways 200, with enhanced particulate capture capabilities within both the internal pores of porous metal media walls, as well as within the small internal bore of the porous metal tubes or honeycomb channels. The high surface area, porous, metal media used in the construction of either the tubular and/or honeycomb fail-safe/regenerator filter devices 129 also heat the incoming pulse cleaning gas, reducing the impact of thermal fatigue of the filter element 28 within the filter array 26, shown in FIG. 1.

The area 210 between said porous metal media tubes 120 welded to a metal plate support 121 and/or cylindrical porous metal media honeycomb cartridge 130, welded to a metal plate support 122, and the metal spacer ring 123, may be void as shown in FIGS. 6 and 7, or may contain a weld perforated metal plate, fine mesh and coarse mesh screen(s)

and Raschig rings. The addition of welded, perforated metal plates, fine mesh and coarse wire mesh screens, and Raschig rings may provide additional heating of the pulse cleaning gas, if required, as well as additional particulate capture capabilities, but these prior art features are optional.

The composition of the porous metal media tubes and/or cylindrical porous metal media honeycomb cartridge fail-safe/regenerators includes but is not limited to 310S, Inconel 600, Hastelloy X, alternate high temperature alloys, intermetallics and the like. Said alloys may be constructed from preferably powder, or fiber metal. Similarly, both porous metal media tubes and/or cylindrical, porous, metal media honeycomb cartridge fail-safe/regenerator filters may be manufactured as a seamless monolithic construction, and contain an internal membrane layer at 127 and/or external membrane 127', consisting of lower porosity, sintered, metal media, to facilitate enhanced particle capture within the fail-safe/regenerator filter unit.

Said porous metal media tubes and/or cylindrical porous metal media honeycomb cartridge fail-safe/regenerator filters may be fabricated from preferably metal powder, or fibers. Said porous metal media tubes may be formed from but not limited to an extrusion process, followed by high temperature sintering in a vacuum or inert gas environment. Similarly the cylindrical porous metal media honeycomb cartridge may be formed in the same fashion, or by an ink jet printing process, followed by high temperature sintering under vacuum or in an inert environment, or via an alternate manufacturing process. Said porous metal media tubular and/or honeycomb fail-safe/regenerator filters 129 are manufactured with a defined open porosity to achieve particulate collection efficiencies of greater than 99.999% for greater than 1–5 $\mu$m (micron) fines, and pressure drop characteristics of less than 0.25–0.5 in-wg/1 fpm.

The porous tubular metal media and/or porous metal media honeycomb cartridge fail-safe/regenerator filters 129, may be permanently or removably installed within the interior chamber 66 of the filter housing 62. When installed as a removable unit, the porous tubular metal media and/or porous metal media honeycomb cartridge fail-safe/ regenerator filters 129, utilize a compliant top or topmost gasket 74 as the primary seal between the stepped section of the filter housing 19 and the top surface of the welded metal spacer ring 124. The use of the top or topmost complaint gasket 74 eliminates the use of the traditional Fiberfrax paper, and serves as the primary seal to prevent passage of particulates from the dirty process gas stream to the clean gas stream. A middle or middlemost compliant gasket 75 is usually positioned between the bottom surface of the welded metal spacer ring 125 and the top surface of the filter flange 18.

When a candle filter 28 is installed into the filter holder and gasket assembly 60, the middle or middlemost compliant gasket 75 is compressed to approximately 5 mm, forming a seal between the metal fail-safe/regenerator filter unit 129 and the filter element 28. A bottom or bottommost complaint gasket 76 is usually positioned at the base of the contoured filter flange 12. The bottom or bottommost compliant gasket 76 is utilized as a cushion and particulate matter barrier seal between the filter element 28, filter housing 62, and cast nut 78. A ceramic sleeve or sock 72 may be installed along the outer surface of the filter element 28. The ceramic sleeve or sock 72 is utilized to prevent accumulation of fines and to further act as a cushion between the filter element 28, and filter housing 62, and cast nut 78. The top or topmost compliant gasket 74, middle or middlemost compliant gasket 75, or bottom or bottommost compliant gasket 76 are preferably made from a single component braided or woven oxide fabric or sleeving that encases an oxide-based continuous or chopped fiber mat, a single end rolled single spiral or rolled woven oxide fabric or sleeving, or a two end rolled double spiral or lapped woven oxide fabric or sleeving.

The porous tubular metal media and/or porous metal media honeycomb cartridge fail-safe/regenerator filters 129 shown in FIGS. 6 and 7 are designed to be utilized with monolithic porous ceramic filter elements or porous metal or intermetallic filter elements 28. Ceramic filament wound and continuous fiber ceramic composite (CFCC) filters, that are manufactured with a smaller filter wall, as well as a top flange surface 18, require the addition of an extended collar 126 at the base of the welded metal spacer ring 123 in order to secure the middle or middlemost compliant gasket 75 between the base of the welded metal spacer ring 125 and the top surface of the candle 18, preventing passage of the middle or middlemost compliant gasket 75 into the inside diameter bore of the candle 28 during pulse cleaning, and subsequent ratcheting of candle 28 in the filter housing and gasket assembly 60, and/or ultimate failure of the candle filter 28. The porous metal media tubular (and/or porous metal media honeycomb) fail-safe/regenerator filters 129 can also be used with a very thin wall CCFC filter via the addition of an extended metal insert that is contoured to fit the inside diameter flange surface of the CCFC element, and the inclusion of an associated compliant gasket positioned between the extended metal insert and internal flange surface.

When porous metal or intermetallic candles are used, the porous tubular metal media and/or porous metal media honeycomb cartridge fail-safe/regenerator filters 129 may be used as described previously for ceramic candle filters 28, or directly welded to the top surface of the filter flange 18, forming an integral unit. Only a top or topmost compliant gasket 74, and a bottom or bottommost compliant gasket 76 are used to seal the integral porous tubular metal media and/or porous metal media honeycomb cartridge fail-safe/ regenerator/porous metal or intermetallic filter element within the filter housing and gasket assembly 60. The use of the ceramic sleeve or sock 72 is arbitrary when porous metal and/or intermetallic filters are installed within the filter housing and gasket assembly 60.

For use as a permanently welded device with application to metallic or intermetallic candle or tube filters 28, all compliant gaskets are eliminated. The permanent weld would result in a seal between the top surface of the metal spacer ring 124 and the stepped section of the filter housing 19, with additional volume provided, if necessary, within the interior chamber 66 of the filter housing 60. Utilizing a straight porous metal or intermetallic tube as opposed to a flanged candle, and welding the straight porous metal or intermetallic tube to the welded tubular or honeycomb fail-safe/regenerator filter/metal spacer ring, which excludes the flat plate and extended section 126, and subsequently welding said unit to the filter housing 60 would provide a porous metal media filtration device with internal fail-safe/ regenerator filter capabilities which eliminates the need for complaint gasket seals, and prevents passage of particulates from the dirty gas process stream into the clean gas stream. The thickness of the top surface of the porous metal or intermetallic candle filter 18 or top surface of the porous metal or intermetallic tube filter may vary. The porous tubular and honeycomb metal fail-safe/regenerator filter concept described above can be modified for use with alternate filter element configurations. Alternately the porous tubular or honeycomb metal fail-safe/regenerator filters 129 could be permanently welded into the filter housing 60 and utilized as a device separate and apart from a porous ceramic or metal filter element, with use of associated middle or middlemost gasket 75, and bottom or bottommost gasket 76, and cast nut 78.

The primary functions of the porous tubular and honeycomb metal fail-safe/regenerator filters 129 are to provide enhanced particulate capture capabilities within both the internal pores of porous media walls, as well as within the small internal bore of the porous metal tubes or honeycomb channel passageways and to to heat the pulse cleaning gas. Additional capture and retention of fines can occur within area 210. These units 129 can be retrofit into existing filtration systems, and utilized with monolithic ceramic, filament wound ceramic, continuous fiber ceramic composite (CCFC), metallic and/or intermetallic filter elements. Similarly the porous tubular and honeycomb metal fail-safe/regenerator filter units can be easily changed-out or replaced once activated. In addition, the porous tubular and honeycomb metal fail-safe/regenerator filters can be separate and apart from, or welded directly to porous metal or intermetallic filter elements, forming an integral metal fail-safe/regenerator/porous metal or intermetallic filter element. Said integral metal fail-safe/regenerator/porous metal or intermetallic filter may have the configuration of a candle or a tube. Said integral metal fail-safe/regenerator/porous metal or intermetallic filter may be either removable from, or welded directly to the filter housing. Also, the porous tubular and honeycomb metal fail-safe/regenerator filter concept can be modified for use with alternate filter element configurations as that of the cross flow, sheet, inverted candle filter, and the like.

The porous metal media tubes and/or cylindrical porous metal media honeycomb cartridge fail-safe/regenerator filters eliminate the use of fine mesh screen and heavy support wire mesh currently installed in existing fail-safe/regenerator filter concepts, and eliminate the use of thin Fiberfrax gaskets, providing enhanced primary sealing through the use of a compliant gasket. The porous metal media tubes and porous metal honeycomb structure functions as an integral unit facilitating heating of the pulse cleaning gas with simultaneous enhanced particulate capture capabilities within both the internal pores of porous media walls, as well as within the small internal bore of the porous metal tubes or honeycomb channel passageways. Should additional heating of the pulse cleaning gas, as well as particulate capture capabilities be required, a welded perforated metal plate, fine mesh screen, coarse wire mesh screen, and Raschig rings, as previously described in the art, are easily included in the tubular porous metal media and/or metal media honeycomb cartridge fail-safe/regenerator filter concepts.

The present invention may be embodied in other forms without departing from the spirit or essential attributes thereof, and accordingly, reference should be made to both the appended claims and the foregoing specification as indicating the scope of the invention.

What is claimed is:

1. Filter assembly for filtering gas, comprising a fail-safe/regenerator filter device and an elongated filter element, within a hot gas cleanup system pressure vessel having a hot contaminating gas entry, said filter assembly comprising:

(a) a filter housing, said filter housing having a peripheral sidewall, said sidewall defining an interior chamber;

(b) a porous, elongated filter element body attached to the bottom end of the fail-safe/regenerator filter device; and (c) a one-piece, all metal, fail-safe/regenerator filter device, having a top and bottom end, disposed within the interior chamber of the filter housing, said fail-safe/regenerator filter device containing a metal support attached to a plurality of porous elongated passageway members selected from: (1) elongated tubes having a bottom end with openings, and (2) honeycomb members having a bottom end with openings and a plurality of parallel passageways with alternative passageways being sealed at the top end and the bottom end, with the open bottom ends facing the filter element.

2. The filter assembly of claim 1, where the fail-safe/regenerator filter device relies solely on the elongated passageway members for filtering particulate matter, and said device not containing additional heat transfer surfaces for particulate removal.

3. The filter assembly of claim 1, also containing complaint gaskets positioned next to the filter element and effective to provide a seal between the hot contaminated entry gas and filtered gas.

4. The filter assembly of claim 1, also containing a means of coupling the filter housing, the fail-safe/regenerator filter device and the filter element.

5. The filter assembly of claim 1, where the passageways are selected from the group consisting of tubular type passageways and honeycomb type passageways.

6. The filter assembly of claim 1, where the passageway members are selected from the group consisting of a plurality of porous metal media tubes that are welded to a perforated plate, and a porous metal media honeycomb cartridge.

7. The filter assembly of claim 1, where the passageway members are porous metal media tubes that are welded to a perforated plate.

8. The filter assembly of claim 1, where the passageway members consist of a porous metal media honeycomb cartridge.

9. The filter assembly of claim 1, where the fail-safe/regenerator filter device is effective to facilitate enhanced capture of particulates in the event of filter element failure and effective for retention of fines during reverse pulse cleaning of the filter elements.

10. A candle or tube filter holder and gasket assembly for holding a candle or tube filter element within a hot gas cleanup system pressure vessel, the filter element including a body having opposing ends, one defining a flange open end and the other defining a closed end; the filter element body having a smaller inner diameter surface and a larger outer diameter surface, said candle or tube filter holder and gasket assembly comprising:

(a) a filter housing, said filter housing having a peripheral sidewall, said sidewall defining an interior chamber;

(b) a filter element selected from the group consisting of a porous monolithic ceramic matrix, a filament wound ceramic matrix, a continuous fiber ceramic composite matrix, or a metal or intermetallic media;

(c) at least one compliant gasket separate and apart from the filter housing, said complaint gasket positioned next to the filter element and effective to provide a seal between the filtered gas and the unfiltered gas, and to cushion the filter element;

(d) means of coupling the filter element, filter housing, and gasket within the pressure vessel; and (e) a fail-safe/regenerator filter device for facilitating enhanced capture of particulates in the event of filter element failure, damage, or breakage, or gasket failure, and heating the pulse cleaning gas, said device selected from a plurality of porous metal media tubes that are welded to a perforated plate, which in turn is welded to a metal spacer ring, and a porous metal media honeycomb member which is welded to a metal support plate, which in turn is welded to a metal spacer ring.

11. The filter assembly of claim 10, where the filter device is porous metal media tubes that are welded to a perforated plate.

12. The filter assembly of claim 10, where the filter device consists of a porous metal media honeycomb member.

13. A filter assembly for filtering gas within a gas cleanup system adapted for use with a combustion turbine, comprising:

a filter housing having a wall defining an interior chamber;

a fail-safe/regenerator filter device having at least first and second ends disposed within the interior chamber of the filter housing, the fail-safe/regenerator filter device containing a metal support attached to a plurality of porous elongated passageway members selected from the group consisting of: (1) elongated tubes having a first end with openings and (2) honeycomb members having a first end with openings; and a porous, elongated filter element body attached to the fail-safe/regenerator filter device.

\* \* \* \* \*